US006981930B2

United States Patent
Ai et al.

(10) Patent No.: US 6,981,930 B2
(45) Date of Patent: Jan. 3, 2006

(54) INTEGRATED ELECTRIC MOTOR AND TRACTION DRIVE

(75) Inventors: Xiaolan Ai, Massillon, OH (US); Geoffrey Bishop, Hartville, OH (US)

(73) Assignee: The Timken Company, Canton, OH (US)

( * ) Notice: Subject to any disclaimer, the term of this patent is extended or adjusted under 35 U.S.C. 154(b) by 116 days.

(21) Appl. No.: 10/733,035

(22) Filed: Dec. 11, 2003

(65) Prior Publication Data

US 2004/0121601 A1 Jun. 24, 2004

Related U.S. Application Data

(60) Provisional application No. 60/433,331, filed on Dec. 13, 2002.

(51) Int. Cl.
*F16H 57/08* (2006.01)

(52) U.S. Cl. ....................................... 475/335; 475/348

(58) Field of Classification Search ................ 475/162, 475/165, 178–9, 335, 348; 476/70; 384/536; 310/89–90
See application file for complete search history.

(56) References Cited

U.S. PATENT DOCUMENTS

| | | | | |
|---|---|---|---|---|
| 1,425,430 | A * | 8/1922 | Wikander | 475/335 |
| 3,380,312 | A | 4/1968 | Barske | |
| 3,945,270 | A | 3/1976 | Nelson et al. | |
| 4,481,842 | A | 11/1984 | Nelson | |
| 4,748,357 | A * | 5/1988 | Kempken | 310/80 |
| 6,536,953 | B1 * | 3/2003 | Cope et al. | 384/536 |
| 6,554,730 | B1 | 4/2003 | Sakai et al. | |
| 6,789,438 | B2 * | 9/2004 | Tanaka et al. | 476/67 |
| 6,817,467 | B2 * | 11/2004 | Watanabe et al. | 198/832 |
| 2004/0071559 | A1 * | 4/2004 | Ai et al. | 417/220 |

FOREIGN PATENT DOCUMENTS

| | | |
|---|---|---|
| EP | 1091144 | 4/2001 |

* cited by examiner

*Primary Examiner*—Roger Pang
(74) *Attorney, Agent, or Firm*—Polster, Lieder, Woodruff & Lucchesi, L.C.

(57) ABSTRACT

An integrated electric motor and traction drive is disclosed. The device comprises an electric motor and a traction drive. The electric motor provides power at a high angular velocity to a sun roller. The sun roller transfers the power to the traction drive which reduces the power to a lower angular velocity and delivers it via an output shaft.

11 Claims, 4 Drawing Sheets

INTEGRATED ELECTRIC MOTOR AND TRACTION DRIVE

CROSS-REFERENCE TO RELATED APPLICATIONS

This application is related to U.S. Provisional Patent Application No. 60/433,331 filed, Dec. 13, 2002, from which priority is claimed, hereby incorporated by reference.

BACKGROUND OF THE INVENTION

Electric motors are one of the most widely used machines. The applications range from automobiles to earth movers, from aerospace to marine machinery, from home appliances to medical equipment. Recently, there have been increasing demands for motors with greater power density. For the purposes of this application, power density can be defined as the amount of power delivered either per unit weight or per unit volume, expressed respectively as W/kg or W/liter. One way to increase power density is to elevate the speed of a motor. As the speed of a motor increases, so does its overall power. As a result, there is a trend in machine designs toward using smaller electric motors operating at higher speeds. In some applications, this results in the speed of the motor being higher than the required speed of the driven member. Therefore, it is often deemed necessary to include a speed reduction unit between the motor and the driven member to reduce the speed of the motor to the required speed of the driven member. Although this results in an overall higher power density, the speed reduction unit still limits power density because of the additional weight and volume.

One solution to this is a so-called gear-head motor where a gear reduction unit is integrated with an electric motor. There are many types of gear-head motors including "precision" gear-head motors, which are capable of running at higher speeds and generally are much more expensive than "regular" gear head motors. However, even with precision-made gear heads, gear-head motors are often limited to operating speeds of 5,000 to 6,000 rpm. This has, to a large degree, prevented the gear-head motors from achieving their ultimate power-density potentials.

Recent developments in traction drives have demonstrated that a well-built traction drive can operate at higher speeds up to and exceeding 10,000 rpm and cost much less than gear-head drives. Thus, integrating a traction drive with an electric motor can increase the system power-density potential and thus extend the scope of application of electric motors.

SUMMARY OF THE INVENTION

Briefly stated, the invention is a motor supplying power at a high angular velocity integrated with a traction drive for receiving the power at a high angular velocity and delivering the power at a lesser angular velocity. The motor comprises a stator, a rotor that revolves in the stator at a high angular velocity, and a sun roller with a first raceway affixed to the rotor. The traction drive comprises a carrier, an outer ring member with an output shaft and a fourth raceway eccentric to the first raceway of the sun roller, and a loading planetary roller supported by the carrier with a third raceway. The third raceway engages with the first raceway of the sun roller and the fourth raceway of the outer ring in a convergent wedge formed by the first and fourth raceways for transferring power between the sun roller and the outer ring. The output shaft of the outer ring delivers power at a lesser angular velocity.

DESCRIPTION OF THE DRAWINGS

In the accompanying drawings which form part of the specification.

Corresponding reference characters indicate corresponding parts throughout the several views of the drawings.

DETAILED DESCRIPTION OF THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
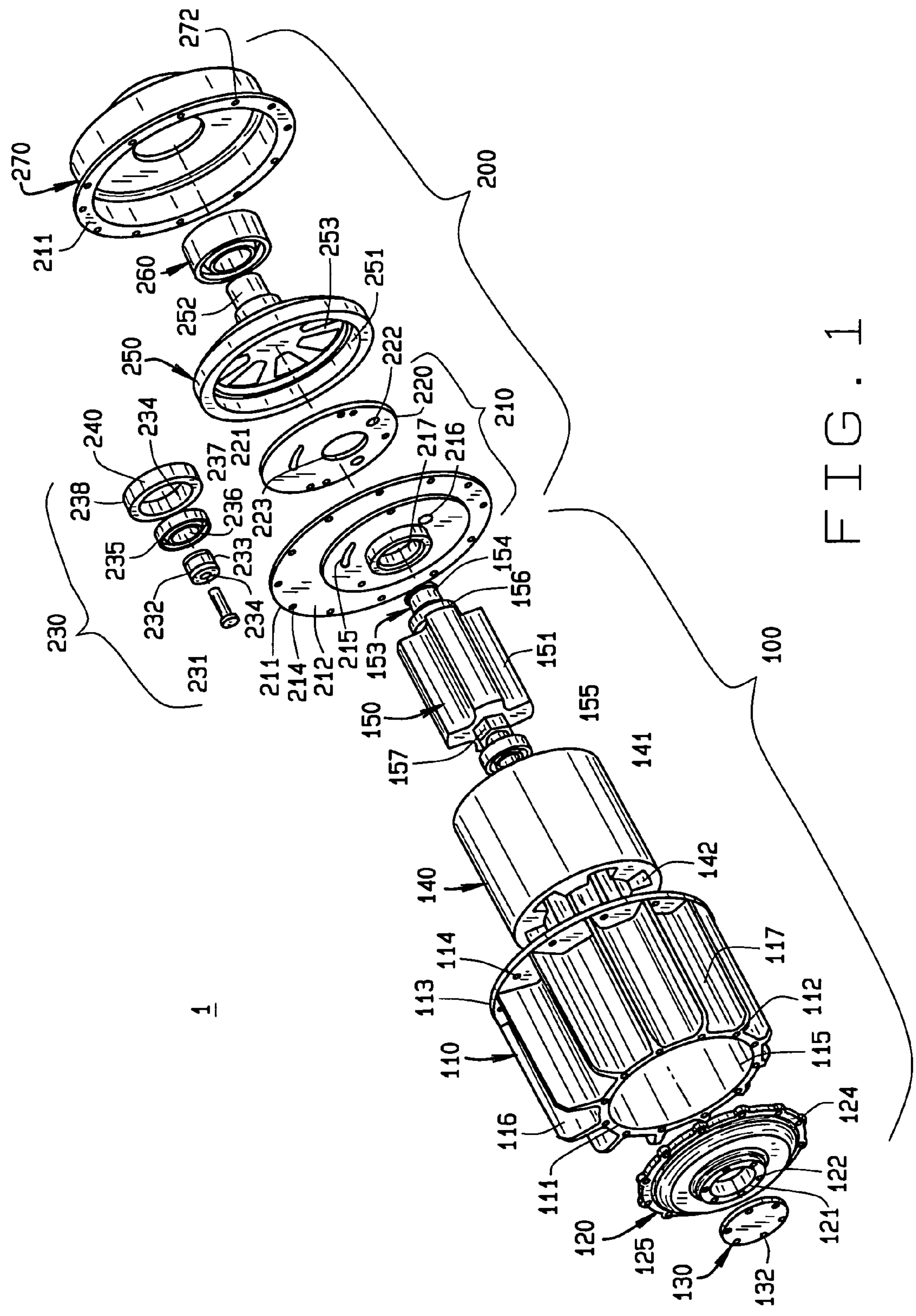
FIG. 1 is an exploded perspective view showing the front of an embodiment of the invention.
Figure 2:
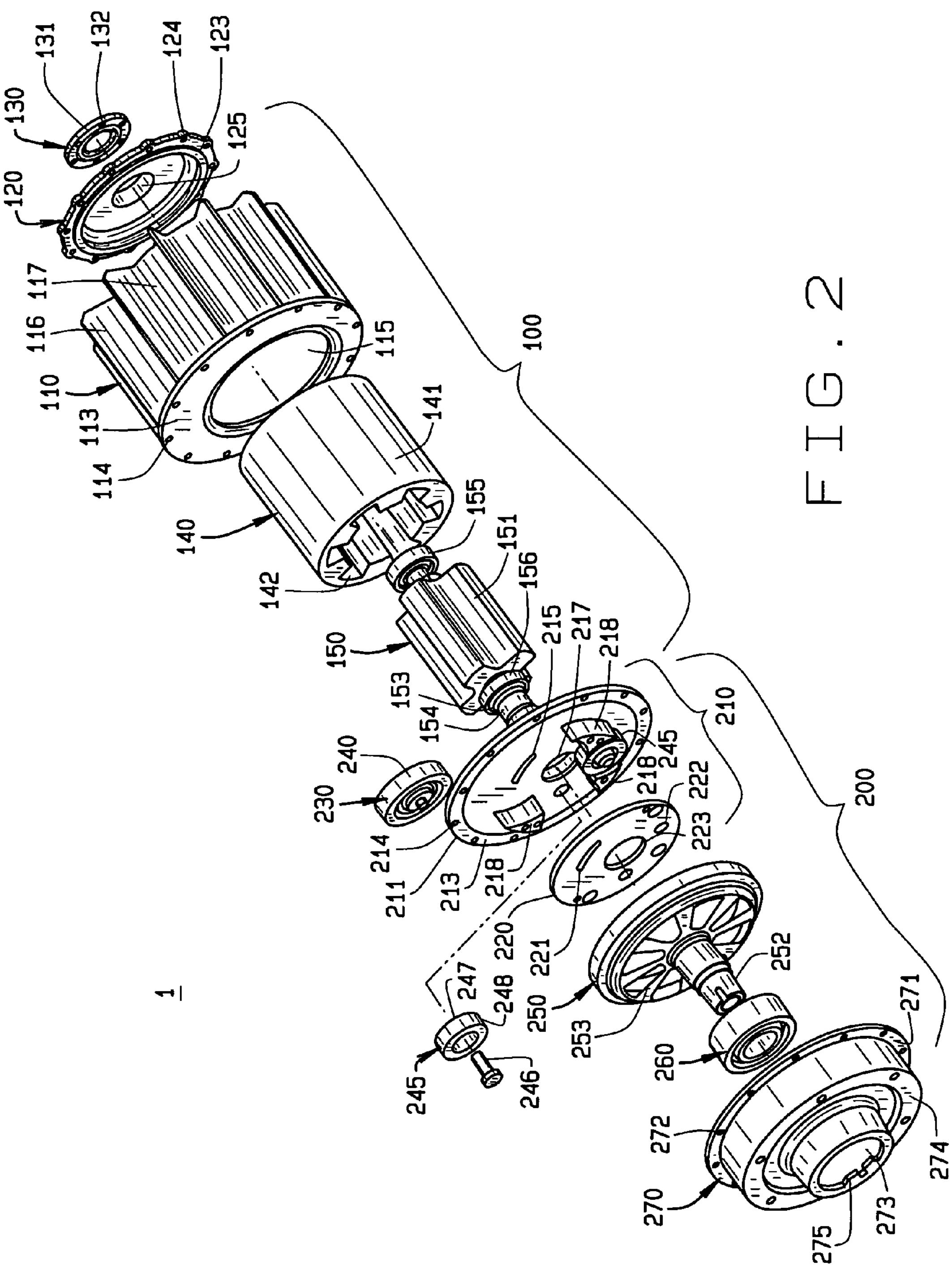
FIG. 2 is an exploded perspective view showing the back of the embodiment.

As shown in FIGS. 1 and 2, an embodiment of an integrated electric motor and traction drive 1 comprises an electric motor 100 and a traction drive 200. As used in this specification, "integrated" is defined as "combining multiple parts to form a single unit."

Figure 3:
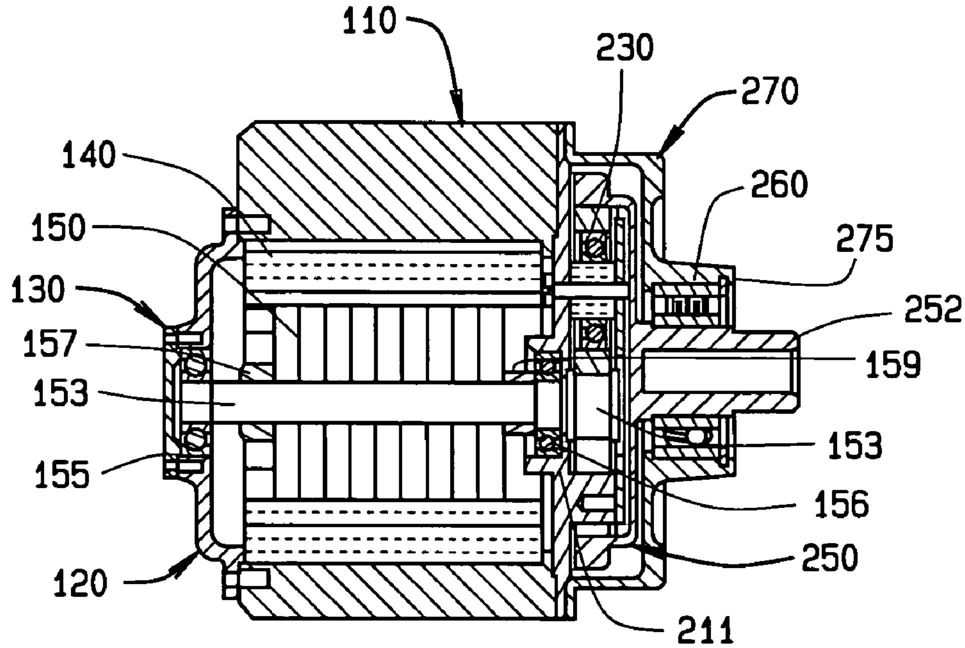
FIG. 3 is a cross-sectional view of the embodiment.

As shown in FIGS. 1–3, the electric motor 100 comprises a motor housing 110, a motor cover 120, a bearing cup plate 130, a stator 140, a rotor 150, and a sun roller 153. The motor housing 110 is a hollow cylinder defining a front face 111 with holes 112 for attaching to the motor cover 120, a back face 113 with holes 114 for attaching to the speed reducer 200, an inner surface 115 for affixing to the stator 140, and cooling fins 116 extending from an outer surface 117 to aid with the dispersal of heat produced during operation. The motor cover 120 is a disk with a raised concentric annulus defining a front face 121 with holes 122 for attaching to the bearing cup plate 130, a back face 123 with holes 124 for attaching to the front face 111 and respective holes 112 of the motor housing 110, and a first bore 125 for supporting the sun roller 153 via a bearing 155. The bearing cup plate 130 is a disk defining a back face 131 with holes 132 for attaching to the front face 121 and respective holes 122 of the motor cover 120. The stator 140 is a hollow cylinder with an outer surface 141 for affixing to the inner surface 115 of the motor housing 110 and internal poles 142 that are energized by electrical power to form magnetic poles for engaging the rotor 150. The rotor 150 is a hollow cylinder defining a second bore for affixing to the sun roller 153 and external male poles 152 for engaging the internal female poles 142 of the stator 140. The sun roller 153 is a shaft defining a first raceway 154 for engaging with the traction drive 200.

As well known to those skilled in the art, electric connections are provided to supply electric power to and from the windings of the internal poles 142 of the stator 140. For easier viewing, the windings are not shown in the drawings. While the embodiment in FIGS. 1–3 discloses a typical switched reluctance motor, other types of motors may be used such as, brushless motors, DC motors, and AC induction motors. While the embodiment in FIGS. 1–3 discloses a rotor 150 that is formed by laminated plates, other types of rotors may be used.

As shown in FIGS. 1–3, the traction drive 200 comprises a carrier 210, a loading planetary roller 230, supporting planetary rollers 245, an outer ring member 250, a double row bearing 260, and a traction drive housing 270. The carrier 210 comprises a base plate 211 and a cover plate 220. The base plate 211 is a disk with a raised concentric annulus defining a front face 212, a back face 213, holes 214 for attaching to the motor housing 110 and the traction drive housing 270, an obround pinhole 215 for supporting the loading planetary roller 230, pinholes 216 for supporting the supporting planetary rollers 245, a third bore 217 for supporting the sun roller 153, and arcuately shaped wedges on the back face 213, hereby referred to as islands 218. The islands 218 act as spacers between the base plate 211 and cover plate 220 defining cavities for receiving supporting planetary rollers 245 and the loading planetary roller 230. The cover plate 220 is a disk defining an obround pinhole 221 for supporting the loading planetary roller 230, pin holes 222 for supporting the supporting planetary rollers 245, and a through hole 223 for hosting the sun roller 153.

The supporting planetary rollers 245 comprise pin shafts 246 and bearings 247. The bearings 247 define second raceways 248 for engaging with the first raceway 154 of the sun roller 153. The bearings 247 affix to the pin shafts 246 so that the second raceways 248 rotates freely. The pin shafts 246 insert into the pinholes 216 of the base plate 211 and the pinholes 222 of the cover plate 220 so that the supporting planetary rollers 245 reside within the cavities defined by the islands 218.

The loading planetary roller 230 comprises a pin shaft 231, an elastic insert 232, a support bearing 235 and a roller 238. The elastic insert 232 is circularly shaped with an outer surface 233 and a center hole 234. The support bearing 235 is a circular anti-friction bearing, such as a ball bearing, with an inner race 236 and an outer race 237. The roller 238 is also circularly shaped with an inner surface 239 and a third raceway 240. When assembled, the support bearing 235 affixes to the elastic insert 232 with its inner race 236 fitted tightly over the outer surface 233 of the insert 232. The roller 238 is fitted to the support bearing 235 with an interference fit between its inner surface 239 and the outer race 237 of the support bearing 235 so that the roller 238 can rotate freely. Next, the elastic insert 232 is affixed to the pin shaft 231 by inserting the pin shaft 231 through the center hole 234 of the elastic insert 232. The pin shaft 231 is inserted into the pinhole 215 of the base plate 211 and the pinhole 221 of the cover plate 220 so that the third raceway 240 engages the first raceway 154 of the sun roller 153 and a fourth raceway 251 of the outer ring 250. The obround shape of the pinholes 215 and 221 allow the pin shaft 231 to slide back and forth slightly. During operation, this allows the loading roller 238 to automatically shift to an effective position for the third raceway 240 of the loading roller 238 to engage in a convergent wedge between the first raceway 154 of the sun roller 153 and a fourth raceway 251 of the outer ring 250 allowing power to be transferred between the sun roller 153 and the outer ring 250. While the pinshaft 231 shown in FIGS. 1–3 is shown to be supported by pinholes 215 and 221, it is also possible to have the pinshaft 231 supported by the carrier 210 through springs or elastomers.

The outer ring member 250 is an annular ring defining the fourth raceway 251 eccentric to the first raceway 154 of the sun roller 153 for engaging the third raceway 240 of the loading planetary roller 230 and the second raceways 248 of the supporting planetary rollers 245, an output shaft 252 for transferring power, and spokes 253 connecting the fourth raceway 251 and output shaft 252 to accommodate any possible misalignment between the fourth raceway 251 and output shaft 252. The output shaft 252 is supported by a back-to-back arranged double-row bearing 260.

The traction drive housing 270 is a hollow cylinder with a raised concentric annulus defining a front face 271 with holes 272 for attaching to the base plate 211 and respective holes 214, a fourth bore 273 for receiving the double row bearing 260, and a back face 274 for external mounting.

To assemble the embodiment, the back face 131 of the bearing cup plate 130 is attached to the front face 121 of the motor cover 120 by aligning holes 132 with respective holes 122 and using appropriate mechanical means, such as bolts or rivets. Similarly, the back face 123 of the motor cover 120 is attached to the front face 111 of the motor housing 110 by aligning holes 124 with respective holes 112 and using appropriate mechanical means, such as bolts or rivets. The stator 140 is inserted in to the motor housing 110 so that the outer surface 141 of the stator 140 is affixed to the inner surface 115 of the motor housing 110.

Figure 4:
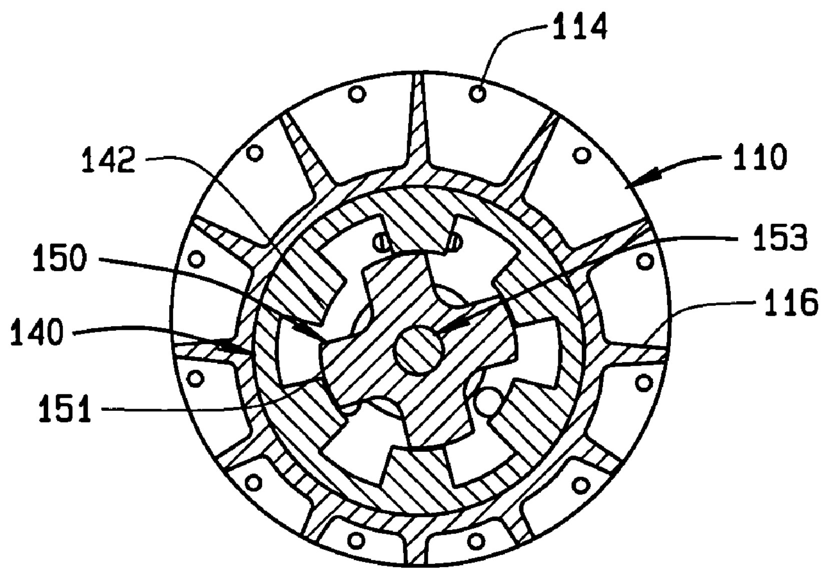
FIG. 4 is a cross-sectional view of the motor.

Bearing 156 is affixed to the sun roller 153 adjacent to the first raceway 154 for rotational support. A sleeve spacer 159 is affixed adjacent to the bearing 156. The rotor 150 is affixed to the sun roller 153 adjacent to the sleeve spacer 159. A nut 157 is affixed to the sun roller 153 to secure the rotor 150. Bearing 155 is affixed to the end of the sun roller 153 opposite the first raceway 154 for rotational support. As shown in FIGS. 3 and 4, the sun roller 153 and rotor 150 insert into the stator 140 so that the bearing 155 affixes to the first bore 125 of the motor cover 120 and the bearing 156 affixes to the third bore 217 of the base plate 211. In this position, the sun roller 153 and the rotor 150 rotate freely within the stator 140. In addition, the first raceway 154 extends past the base plate 211 so that the first raceway 154 rotates within the carrier 210.

To assemble the carrier 210, the cover plate 220 attaches to the islands 218 of the base plate 211. The pinshafts 246 of the supporting planetary rollers 245 are inserted into the pinholes 216 of the base plate 211 and the pinholes 222 of the cover plate 220 so that the second raceways 248 frictionally engage the first raceway 154 of the sun roller 153. The pinshaft 231 of the loading planetary roller 230 is inserted into the pinhole 215 of the base plate 211 and the pinhole 221 of the cover plate 220 so that the third raceway 240 frictionally engages the first raceway 154 of the sun roller 153.

The double row bearing 260 affixes to the fourth bore 273 of the traction drive housing 270. To further secure the double row bearing 260, a snap ring 275 may be used. The double row bearing 260 affixes to the output shaft 252 of the outer ring member 250 so that the outer ring member 250 can rotate freely. The front face 271 of the traction drive housing 270 attaches to the back face 213 of the base plate 211 by aligning holes 272 with respective holes 214 and using appropriate mechanical means, such as bolts or rivets. In this position, the fourth raceway 251 of the outer ring member 250 frictionally engages the third raceway 240 of the loading planetary roller 230 and the second raceways 248 of the supporting planetary rollers 245.

In operation, electric power is supplied to the windings of the internal female poles 142 causing the rotor 150 and sun roller 153 to rotate and transfer power at a high angular velocity. Power is transferred from the first raceway 154 of the sun roller 153 to the second raceways 248 of the supporting rollers 245 and the third raceway 240 of the loading planetary roller 230. Then, power is transferred from the second raceways 248 and the third raceway 240 to the fourth raceway 251 of the outer ring 250. Finally, power is transferred via the spokes 253 of the outer ring 250 to the output shaft 252 where it is output at a lesser angular velocity.

Figure 5:
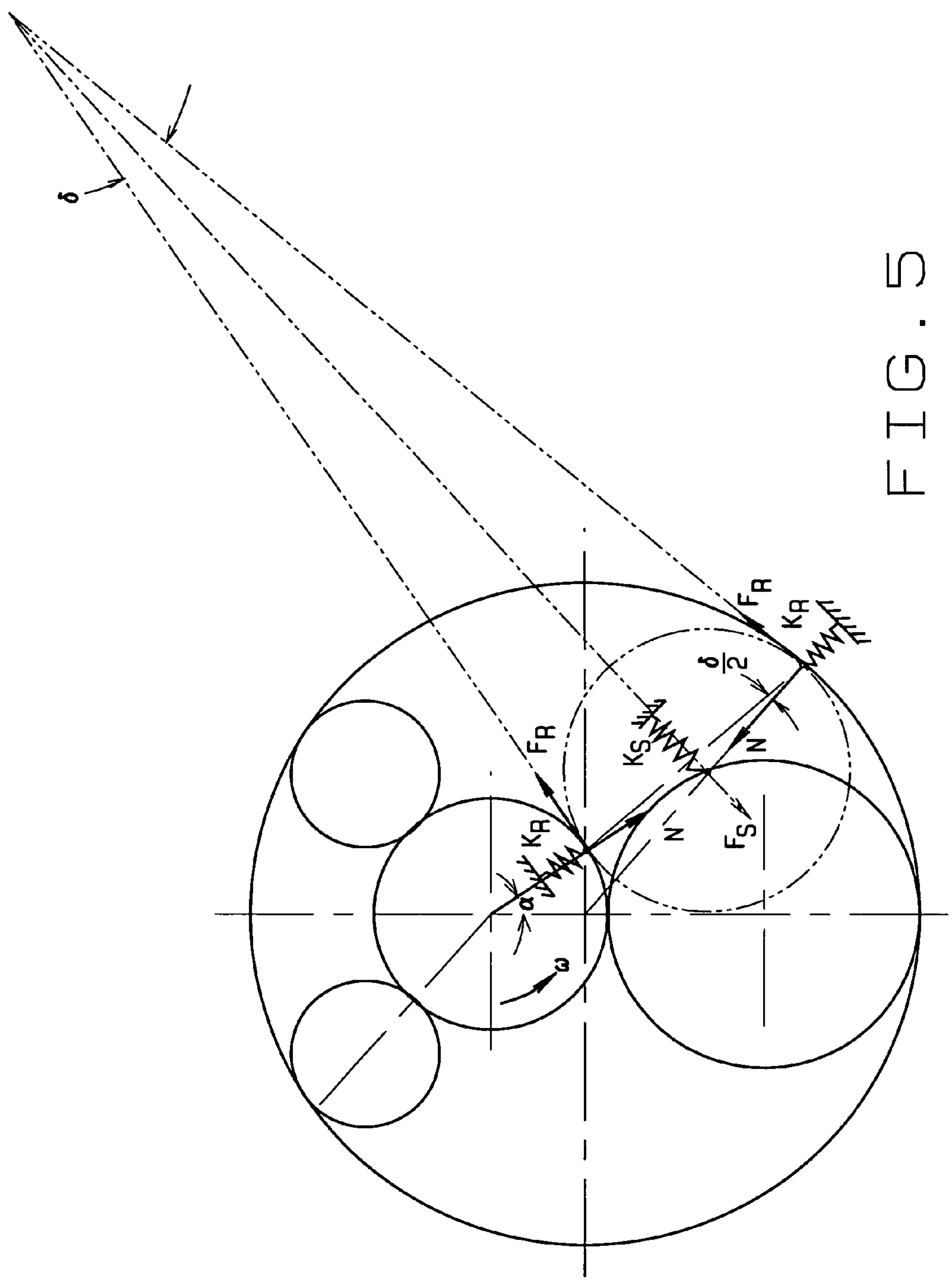
FIG. 5 is a diagram showing forces at the raceways and at a support shaft of the embodiment.

As the sun roller 153 rotates in FIG. 5, the friction force $F_R$ (traction) generated at the contact between the first raceway 154 and third raceway 240 of the loading planetary roller 230 tends to rotate the loading roller 230 and generate a reaction friction force $F_R$ at the contact between the third raceway 240 and the fourth raceway 251 of the outer ring 250. These friction forces pull the loading roller 230 into a converged wedge gap between the sun roller 153 and the outer ring 250 in either direction depending upon the rotation direction of the sun roller 153. The friction forces $F_R$ are balanced by normal contact forces N at the contacts between the first raceway 154 and third raceway 240 and between the fourth raceway 251 and third raceway 240, and by a supporting force $F_S$ provided from carrier 210 via pin shaft 231, elastic insert 232, and support bearing 235 to the loading roller 238.

The amount of normal force N generated in response to friction force $F_R$ is controlled by the supporting stiffness $K_S$ of the loading roller 230 assembly in relationship with the contact stiffness at the contacts along with the structural flexibility of outer ring 250 and the flexibility of other relevant components. Assume the lumped effective contact stiffness, representing Hertzian contact stiffness, structural flexibility of outer ring 250 and all other relevant components, be denoted as $K_R$. The following relationship generally holds true.

$$\frac{K_S}{K_R} = \mu_o \sin\delta - 2\sin^2\left(\frac{\delta}{2}\right) \quad (1)$$

where $K_S$=effective support stiffness of loading roller $K_R$=effective contact stiffness between the loading roller and the sun roller and between the loading roller and the outer ring $\mu_o$=operating traction coefficient $\delta$=operating wedge angle (different from initial wedge angle)

To prevent the traction drive 200 from excessive slip at the contacts, the following inequality must be held.

$$\frac{K_S}{K_R} = \mu_o \sin\delta - 2\sin^2\left(\frac{\delta}{2}\right) \le \mu_m \sin\delta - 2\sin^2\left(\frac{\delta}{2}\right) \quad (2)$$

where $\mu_m$=maximum available traction coefficient.

The second raceways 248 of the supporting rollers 245 are placed between and in contact with the first raceway 154 of the sun roller 153 and fourth raceways 251 of the outer ring 250. The supporting rollers 245 provide appropriate forces at the contacts between the outer ring 250 and the respective supporting rollers 245 to balance out the contact forces at the contact between the outer ring 250 and the loading roller 230. Likewise, the supporting rollers 245 provide appropriate forces at contacts between the sun roller 153 and the supporting rollers 245 to balance out the contact forces at the contact between the sun roller 153 and the loading roller 230. Thus, forces acting on the outer ring 250 and the sun roller 153 are internally self-balanced.

As can be appreciated, the frictional forces may also be generated at the contacts between the supporting rollers 245 and the outer ring 250 and between the supporting rollers 245 and the sun roller 153. These friction forces can also help to transmit torque and power between the sun roller 153 and outer ring 250.

For efficiency considerations, conventional traction drives have to operate with a wedge angle smaller but close to the so-called friction angle $\delta_f$ defined as:

$$\delta_f = 2 \text{ Arc tan } \mu \quad (3)$$

where $\mu$ is the friction coefficient at the contact.

This imposes an undesirable design constraint on the azimuth position of the loading roller 230 since the wedge angle $\delta$ is directly related to the azimuth position $\alpha$ of the loading roller 230 in relation to the eccentricity e of the sun roller's first raceway 153 with respect to the outer ring's fourth raceway 251.

As indicated by equation (2), by choosing appropriate ratio of effective supporting stiffness $K_S$ to effective contact stiffness $K_R$ it is possible to operate the traction drive 200 at a wide range of given operating wedge angle regardless of the friction coefficient, without sacrificing the drive's efficiency. That is to say, the traction drive 200 is capable of operating with operating traction coefficient close to the maximum available value even at a small wedge angle. This allows the loading roller 230 to be placed at or in vicinity to the azimuth position corresponding to the widest wedge gap. Consequently, the same loading roller 230 can be used as a bi-directional loading mechanism, substantially simplifying the design and construction of the traction drive 200.

As various changes could be made in the above constructions without departing from the scope of the invention, it is intended that all matter contained in the above description or shown in the accompanying drawings shall be interpreted as illustrative and not in a limiting sense.

What is claimed is:

1. An integrated motor and traction drive comprising:

a motor supplying power at a high angular velocity, the motor comprising a stator, a rotor which revolves in the stator at a high angular velocity, and a sun roller affixed to the rotor having a first raceway;

a traction drive for receiving power at a high angular velocity and delivering the power at a lesser angular velocity, the traction drive comprising a carrier, an outer ring member having a fourth raceway eccentric to the first raceway of the sun roller and an output shaft for delivering power at a lesser angular velocity, and a loading planetary roller supported by the carrier having a third raceway that engages with the first raceway of the sun roller and the fourth raceway of the outer ring forming a converged wedge for transferring power between the sun roller and the outer ring;

a base plate having a pinhole for supporting the loading planetary roller, a third bore for supporting the sun roller, pinholes for supporting the supporting planetary rollers, and islands; and a cover plate affixed to the base plate having a pinhole for supporting the loading planetary roller and a hole for hosting the sun roller.

2. An integrated motor and traction drive according to claim 1, wherein the third raceway engages with the first raceway of the sun roller and the fourth raceway of the outer ring to satisfy the equation $$\frac{K_S}{K_R} = \mu_o \sin\delta - 2\sin^2\left(\frac{\delta}{2}\right) \le \mu_m \sin\delta - 2\sin^2\left(\frac{\delta}{2}\right);$$

wherein $K_S$ is an effective support stiffness of the loading planetary roller;

wherein $K_R$ is an effective contact stiffness between the loading planetary roller and the sun roller and between the loading planetary roller and the outer ring;

wherein $\mu_m$ is a maximum available traction coefficient; and wherein δ is an operating wedge angle.

3. An integrated motor and traction drive according to claim 1, further comprising a supporting planetary roller supported by the carrier having a second raceway that engages with the first raceway and fourth raceway to self-balance internal forces.

4. An integrated motor and traction drive according to claim 3, wherein the supporting planetary roller comprises a pin shaft supported by the carrier and a bearing affixed to the pin shaft.

5. An integrated motor and traction drive according to claim 1, further comprising a housing affixed to the stator and the carrier having a first bore for supporting the sun roller and a fourth bore for supporting outer ring.

6. An integrated motor and traction drive according to claim 5, wherein the housing comprises:

a motor housing attached to the carrier and affixed to the stator, a motor cover attached to the motor housing having the first bore for supporting the sun roller, a bearing cup plate attached to the motor cover to secure the sun roller; and a traction drive housing attached to the carrier having the fourth bore for supporting the outer ring.

7. An integrated motor and traction drive according to claim 1, wherein the loading planetary roller comprises:

a support bearing having an outer race and an inner race, such that the outer race of the support bearing engages an inner surface of the loading planetary roller allowing the loading planetary roller to rotate freely;

an elastic insert having an outer surface and a center hole, such that the outer surface of the elastic insert engages the inner race of the support bearing; and a pin shaft engaged with the center hole of the elastic insert, such that the loading planetary roller, support bearing, and elastic insert are supported by the carrier and the third raceway of the loading planetary roller engages the first raceway of the sun roller and fourth raceway of the outer ring forming a converged wedge for transferring power from the first raceway to the fourth raceway.

8. An integrated motor and traction drive comprising:

a motor supplying power at a high angular velocity, the motor comprising a stator, a rotor which revolves in the stator at a high angular velocity, and a sun roller affixed to the rotor having a first raceway;

a traction drive for receiving power at a high angular velocity and delivering the power at a lesser angular velocity, the traction drive comprising:

a carrier comprising a base plate having a pinhole for supporting the loading planetary roller, a third bore for supporting the sun roller, pinholes for supporting the supporting planetary rollers, and islands; and a cover plate affixed to the base plate having a pinhole for supporting the loading planetary roller and a hole for hosting the sun roller;

an outer ring member having an a fourth raceway eccentric to the first raceway of the sun roller and an output shaft for delivering power at a lesser angular velocity;

a loading planetary roller supported by the carrier having a third raceway that engages with the first raceway of the sun roller and the fourth raceway of the outer ring forming a converged wedge for transferring power between the sun roller and the outer ring, the loading planetary roller comprising a support bearing having an outer race and an inner race, such that the outer race of the support bearing engages an inner surface of the loading planetary roller allowing the loading planetary roller to rotate freely; an elastic insert having an outer surface and a center hole, such that the outer surface of the elastic insert engages the inner race of the support bearing; and a pin shaft engaged with the center hole of the elastic insert, such that the loading planetary roller, support bearing, and elastic insert are supported by the carrier and the third raceway of the loading planetary roller engages the first raceway of the sun roller and fourth raceway of the outer ring forming a converged wedge for transferring power from the first raceway to the fourth raceway;

a supporting planetary roller supported by the carrier having a second raceway that engages with the first raceway and fourth raceway to self-balance internal forces; and a housing affixed to the stator and the carrier having a first bore for supporting the sun roller and a fourth bore for supporting outer ring.

9. An integrated motor and traction drive according to claim 8, wherein the supporting planetary roller comprises a pin shaft supported by the carrier and a bearing affixed to the pin shaft.

10. An integrated motor and fraction drive according to claim 8, wherein the housing comprises:

a motor housing attached to the carrier and affixed to the stator, a motor cover attached to the motor housing having a first bore for supporting the sun roller, a bearing cup plate attached to the motor cover to secure the sun roller; and a traction drive housing attached to the carrier having a fourth bore for supporting the outer ring.

11. An integrated motor and traction drive according to claim 8, wherein the third raceway engages with the first raceway of the sun roller and the fourth raceway of the outer ring to satisfy the equation $$\frac{K_S}{K_R} = \mu_o \sin\delta - 2\sin^2\left(\frac{\delta}{2}\right) \le \mu_m \sin\delta - 2\sin^2\left(\frac{\delta}{2}\right);$$

wherein $K_S$ is an effective support stiffness of the loading planetary roller;

wherein $K_R$ is an effective contact stiffness between the loading planetary roller and the sun roller and between the loading planetary roller and the outer ring;

wherein $\mu_m$ is a maximum available traction coefficient; and wherein δ is an operating wedge angle.

* * * * *

UNITED STATES PATENT AND TRADEMARK OFFICE

CERTIFICATE OF CORRECTION

PATENT NO. : 6,981,930 B2

DATED : January 3, 2006

INVENTOR(S) : Xiaolan Ai et al.

It is certified that error appears in the above-identified patent and that said Letters Patent is hereby corrected as shown below:

<u>Column 8,</u>
Line 38, replace “fraction” with -- traction --.

Signed and Sealed this

Twenty-first Day of March, 2006

JON W. DUDAS

*Director of the United States Patent and Trademark Office*